S. W. CRAMER.
HUMIDIFYING AND AIR CONDITIONING APPARATUS.
APPLICATION FILED APR. 1, 1907.
914,640.
Patented Mar. 9, 1909.
5 SHEETS—SHEET 1.
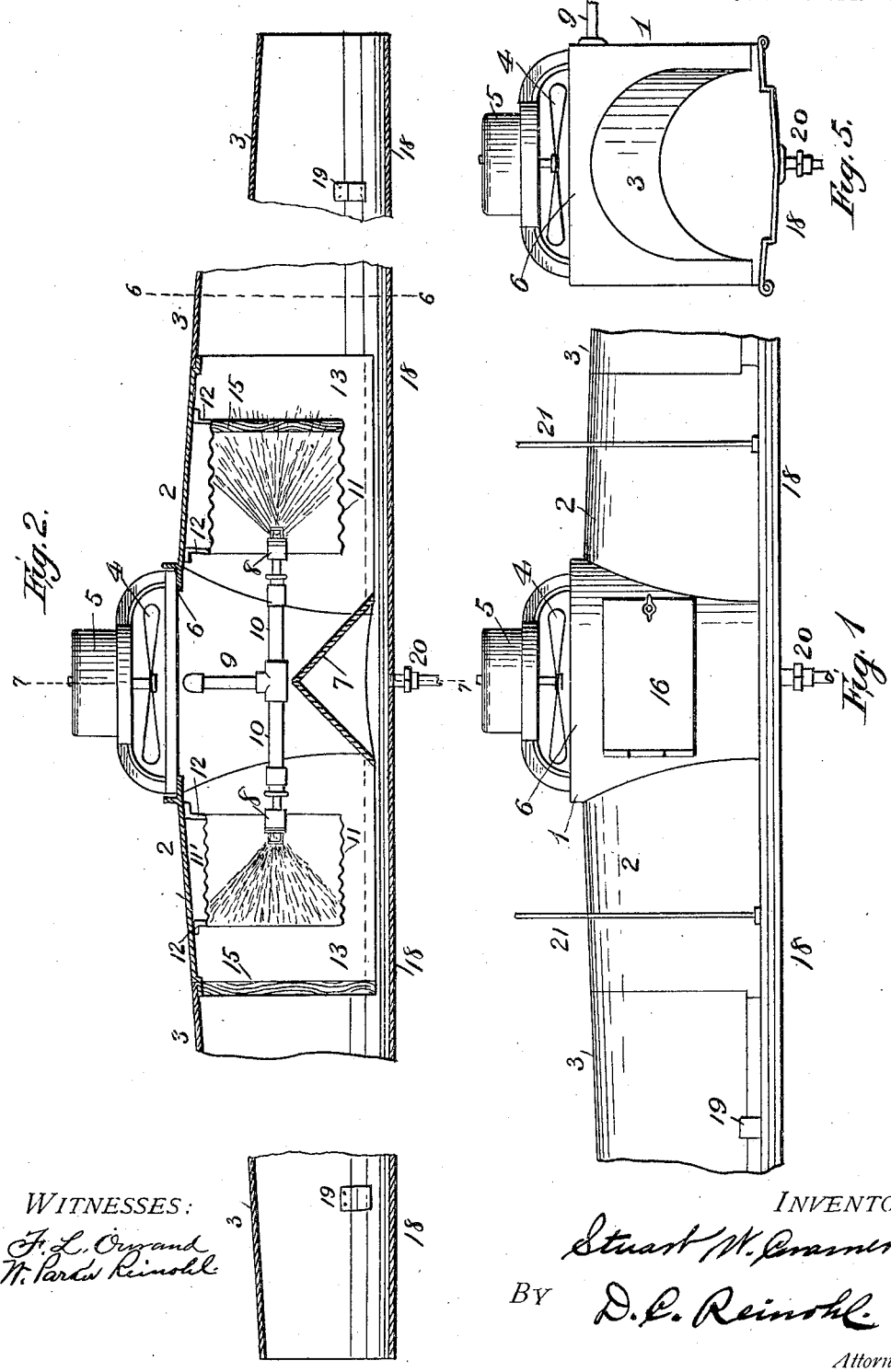
WITNESSES:
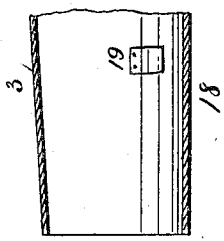
INVENTOR
Stuart W. Cramer.
BY D. L. Reinohl.
Attorney S. W. CRAMER.
HUMIDIFYING AND AIR CONDITIONING APPARATUS.
APPLICATION FILED APR. 1, 1907.

914,640.

Patented Mar. 9, 1909.
5 SHEETS—SHEET 2.

Witnesses

Inventor
Stuart W. Cramer.
By
D. C. Reinohl.
Attorney

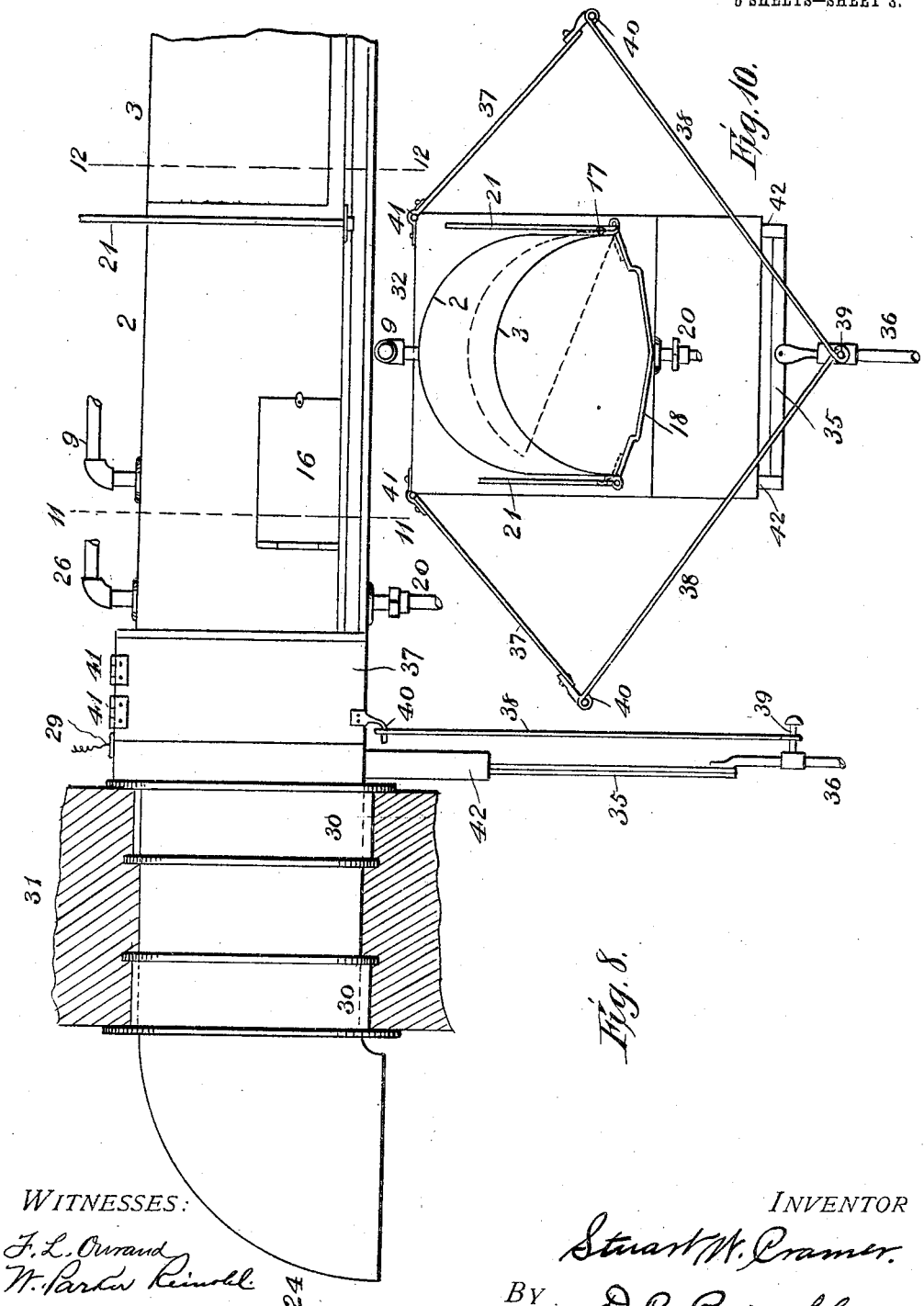

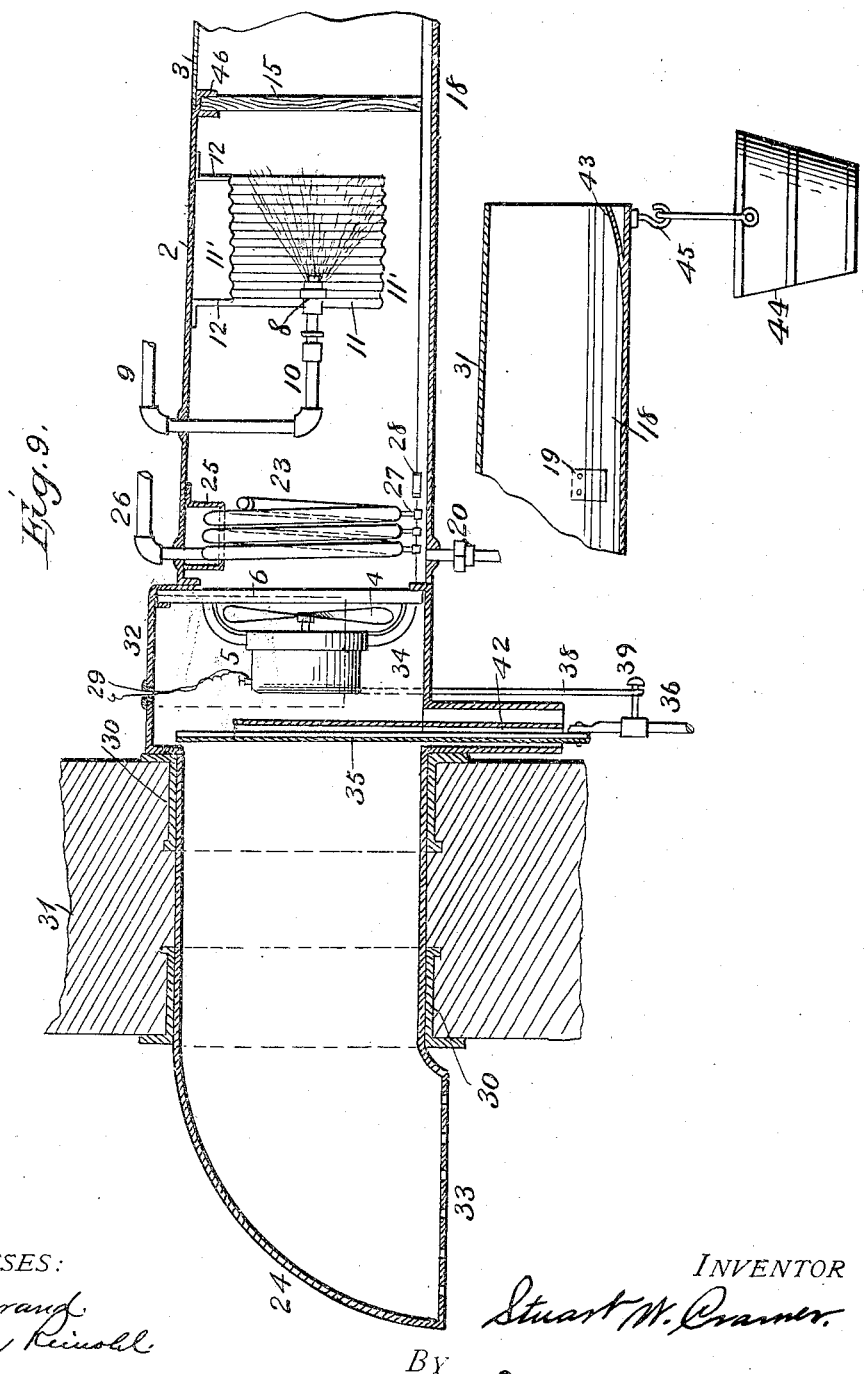

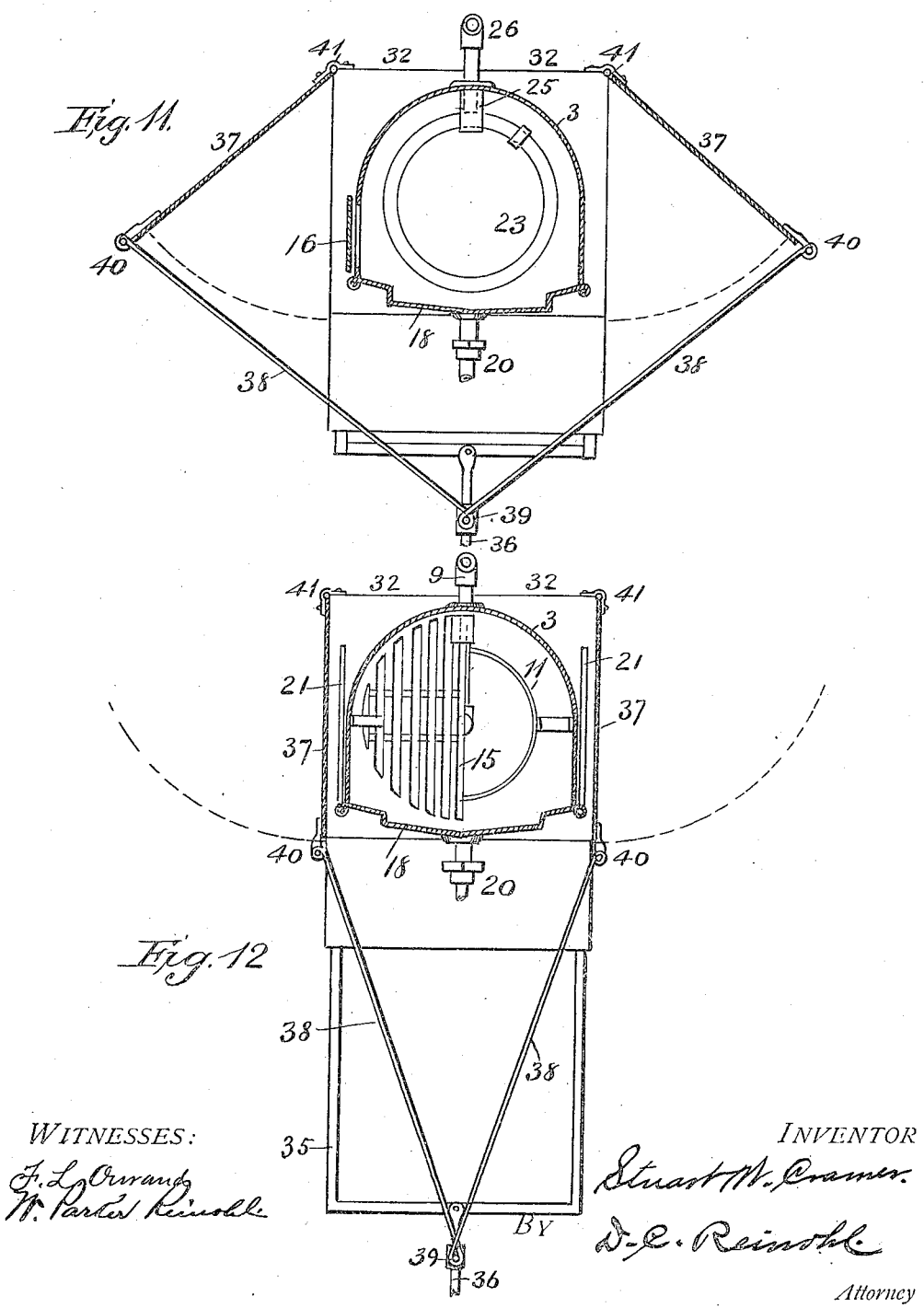

UNITED STATES PATENT OFFICE.

STUART W. CRAMER, OF CHARLOTTE, NORTH CAROLINA.

HUMIDIFYING AND AIR-CONDITIONING APPARATUS.

No. 914,640.    Specification of Letters Patent.    Patented March 9, 1909

Application filed April 1, 1907. Serial No. 365,727.

*To all whom it may concern:*

Be it known that I, STUART W. CRAMER, a citizen of the United States, residing at Charlotte, in the county of Mecklenburg and State of North Carolina, have invented certain new and useful Improvements in Humidifying and Air-Conditioning Apparatus; and I do hereby declare the following to be a full, clear, and exact description of the invention, such as will enable others skilled in the art to which it appertains to make and use the same.

My invention relates to humidifying and air conditioning apparatus, has for its object further developments in the device, shown and described in my application for a patent, Serial No. 312,453, and consists in certain improvements in construction which will be fully disclosed in the following specification and claims.

Figure 4:
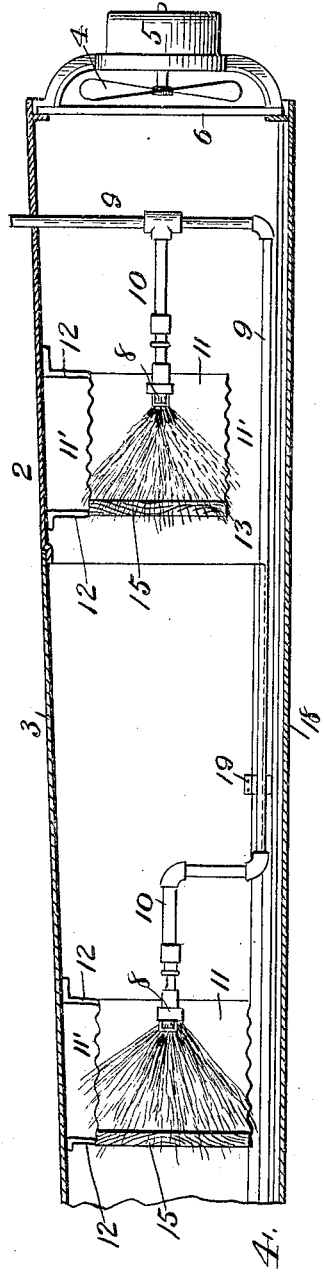
Figure 7:
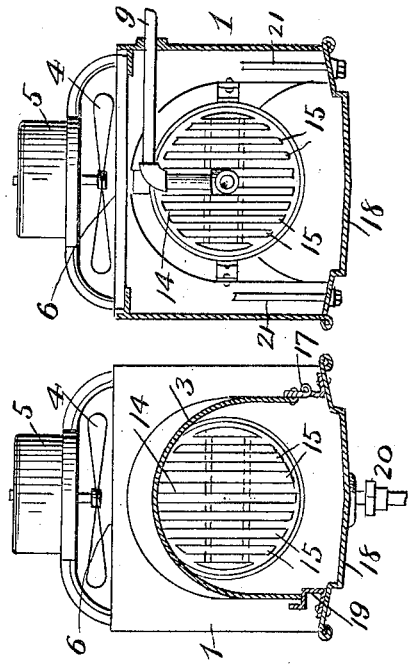
Figure 6:
Figure 3:
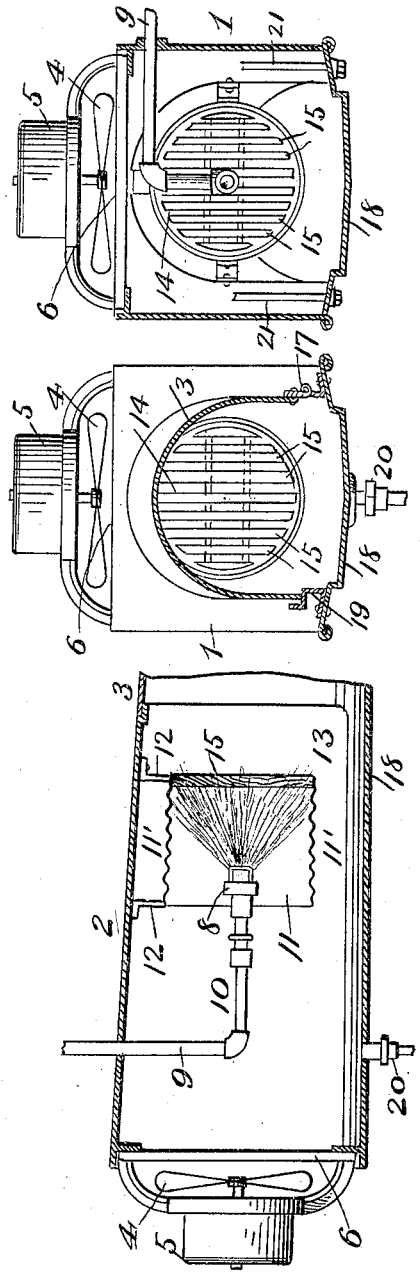

In the accompanying drawings, which form part of this specification:—Figure 1 represents a side elevation of a duplex humidifier embodying my invention, with part of the elongated horizontal extension broken off. Fig. 2 a vertical longitudinal section of the same, the extensions being shown broken. Fig. 3 a like view of a humidifier having a single spray-head. Fig. 4 a like view of a humidifier having two spray-heads in one casing and one horizontal extension. Fig. 5 an end elevation. Fig. 6 a vertical transverse section on line 6, 6, Fig. 1. Fig. 7 a like view on line 7, 7, of the same figure. Fig. 8 a side elevation of a modified construction including means for supplying air from outside the building, and a heating coil. Fig. 9 a vertical longitudinal section of the same. Fig. 10 an end elevation. Fig. 11 a vertical transverse section on line 11, 11, on Figs. 8 and 9, and Fig. 12 a like view on line 12, 12 on the same figures.

Reference being had to the drawings and the designating characters thereon, the numeral 1 indicates a head or central portion of the casing, which in the duplex humidifier is provided with primary branches or extensions 2, 2, one on each side of the head 1, and with supplemental elongated horizontal extensions 3, 3, while in the single humidifier only one primary extension 2, and one supplemental extension 3 are used.

4 indicates a fan propeller which may be driven by an electric motor 5, or by any other preferred means and supplies air from the room in which the humidifier is located, through the open top 6 of the head of the casing, and on which the fan and the motor rest, in the construction of the duplex humidifier.

7 indicates a double walled deflector under the fan for directing the air toward each end of the casing.

8 are spray-heads for supplying water in the form of finely attenuated spray, or aqueous vapor, supplied in the usual manner through pipe 9, and branch 10, on which the spray-head is supported.

11 indicates an annular deflector having a corrugated wall against which the spray from the spray-head is projected with such force as to cause the finely attenuated particles of water to be deflected and further broken up. The deflector is concentrically supported in the casing on suitable stays 12 properly secured to the wall of the casing, forming an annular chamber 11' around the deflector.

Within the casing is a spray chamber 13 for each extension of the casing, and in which the deflector 11 and the spray-head 8 are located, and in which chamber the air passing through the casing receives its initial dousing or saturation with water supplied by the spray-head.

14 is a grate preferably of cypress-wood, the bars of which form a plurality of collecting and evaporative bodies or surfaces 15 against which the saturated air impinges for condensing and extracting surplus water from the air and for the further saturation of the air before it issues from the humidifier. The collecting and evaporating bodies may be placed in the end of the corrugated deflector 11, as shown in Figs. 2, 3 and 4, or they may be placed beyond the deflectors at the end of the primary extension 3 of the casing, as shown in Fig. 9, or they may be placed at any desired point throughout the casing of the humidifier.

16 is a door in the side of the head 1 of the casing to afford access to the interior thereof, and the supplemental extension 3 is provided with hinges 17 on one side which are secured to the longitudinal drip pan 18, and the opposite side of the casing rests upon supports 19. The hinging of this section of the casing affords ready means for raising the section for removing dust and lint which is collected as it is extracted from the air by the cleansing and purifying action of the humidifier. Surplus water is conducted from the drip pan 18 by a pipe 20, and the whole apparatus is supported on rods 21, or in any preferred manner.

The supplemental extension 3 is preferably inclined or tapered on its top toward the end of the extension, and the interior of said extension forms a collecting and condensing chamber 22 by the impingement of the moistened or saturated air against the wall of the chamber and on which wall any heavy bodies of water or spray collect and gravitate into the drip pan.

In the single humidifiers, the head 1 may be dispensed with and the fan 4 and the motor 5 secured to the end of the primary extension 3, as shown in Figs. 3 and 4.

23 is a steam coil for heating air as it comes from outside the building through the fresh air duct 24 in the winter, 25 a strap for supporting the steam coil, 26 a pipe for supplying the coil 23 with steam.

27 is a drip pipe for taking the water of condensation out of the steam coil 23 and is provided with a valve 28 of the well known type for automatically discharging the water of condensation as fast as it collects.

29 are electric wires leading to the motor.

30 are cast iron rings set in the wall 31, and through which the fresh air duct or pipe 24 extends and connects the extension 32 of the casing of the humidifier with the outside air. The fresh air duct is turned downward to keep out rain and is also provided with a screen 33 to prevent birds nesting in the casing.

34 is an air mixing chamber in the extension 32, provided with a sliding damper 35 which is raised and lowered by a rod 36 to admit a greater or less quantity of fresh air as may desired. On each side of the extension 32 are damper doors 37, also connected to the rod 36 by arms 38 pivoted at 39 and also connected to the doors at 40, and are provided with hinges 41 at their upper ends connecting them with the top of the extension 32. By referring to the sectional views it will be seen that Fig. 11 shows the side dampers 37 open and the end or sliding damper 35 closed, thus admitting air from the inside of the room only to the casing. Fig. 12 shows the side dampers 37 closed and the damper 35 drawn down or open to its full extent, thereby admitting air to the casing only from outside the building. By properly manipulating the dampers 35 and the dampers 37, 37, air may be drawn into the casing exclusively from the inside or the outside of the building or the air may be drawn from both sources of supply to furnish the propeller fan as may be desired.

42 are grooves in which the sliding damper 35 slides up and down in the extension 32 of the casing.

43 is a sheet metal incline in the end of the drip pan 18, 44 a pail used for cleaning out the drip pan, and may be suspended on a hook 45.

The extension 3 is thrown up to one side on its hinges 17 for cleaning purposes, as shown in dotted lines in Fig. 10, thus affording ample space for the introduction of a mop to clean out the lint, dust and other solid bodies drawn into the casing by the propeller fan.

46 are sheet metal clips for supporting the grate 14.

The term spray-chamber refers to that part of the casing in which the air is mixed or saturated with spray, and the term collecting and condensing chamber refers to that part within the casing where the coarse spray is either condensed by a plurality of collecting and condensing bodies, or by contact with the wall of the extension 3 of the casing on which the coarse spray collects and gravitates into the drip pan.

Having thus fully described my invention, what I claim is—

1. In a humidifier, a casing, a spray chamber within the casing, an elongated horizontal extension of the casing forming a condensing and collecting chamber, means for supplying air to the casing, means for supplying spray to the air as it passes through the casing, condensing and evaporative bodies arranged in the path of the saturated air, and a drip pan on which said horizontal extension is removably supported.

2. In a humidifier, an elongated horizontal casing provided with a spray chamber, an extension of the casing forming a condensing and collecting chamber, a spray-head concentrically arranged in the spray chamber, a propeller fan, and a drip pan on which said extension of the casing is removably supported.

In testimony whereof I affix my signature, in presence of two witnesses.

STUART W. CRAMER.

Witnesses:
 ED. SÖHLE,
 R. I. DALTON.